July 15, 1958 R. H. GRIEST 2,843,351
BALANCED SERVO VALVE
Filed Jan. 31, 1955
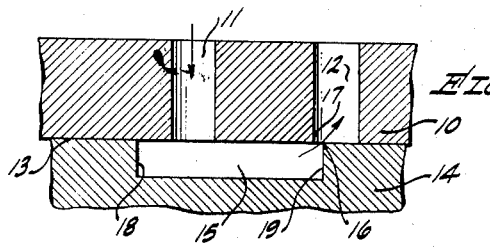
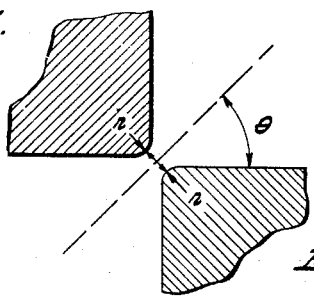
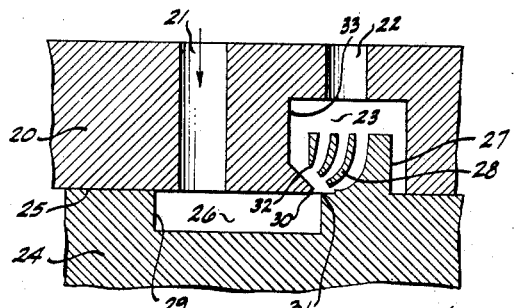
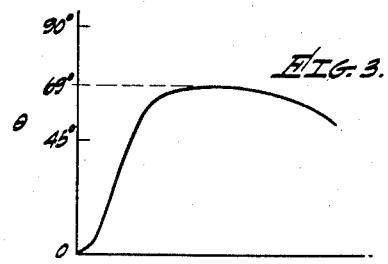
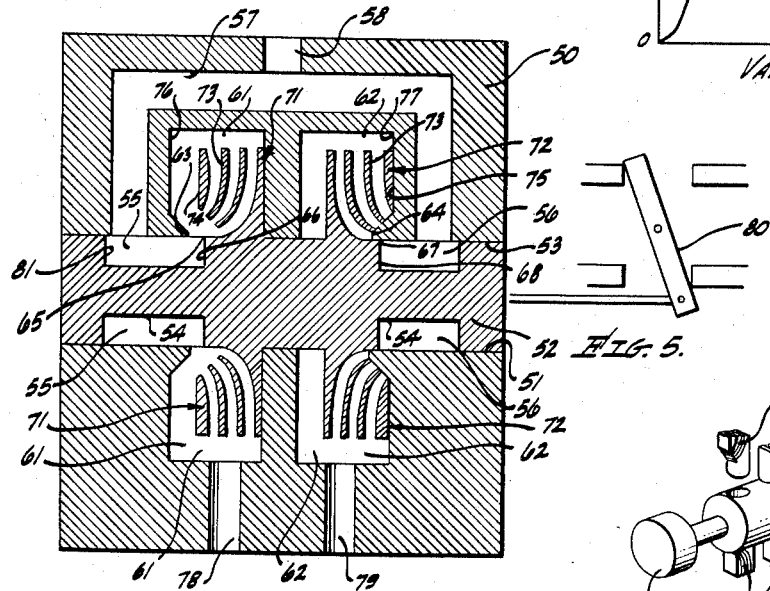
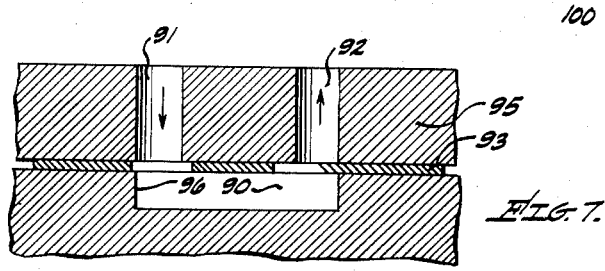
INVENTOR.
RAYMOND H. GRIEST,
BY
Henry Heyman
ATTORNEY.

United States Patent Office 2,843,351
Patented July 15, 1958

2,843,351

BALANCED SERVO VALVE

Raymond Howard Griest, Los Angeles, Calif., assignor to Hughes Aircraft Company, Culver City, Calif., a corporation of Delaware Application January 31, 1955, Serial No. 484,966

5 Claims. (Cl. 251—120)

This invention relates to fluid valves and more particularly to improved hydraulic servo valves.

In the field of servo mechanisms and control systems the servo valves commonly used in the art have been satisfactory in most respects. However, with the increasing demands for high performance components in servo systems used in applications requiring fast and accurate response, the servo valves of the prior art, such as spool valves and sliding plate valves have shown inherent limitations which make their use difficult in systems such as those designed for controlling high speed aircraft and missiles. For very fast and accurately responsive servo systems high gain and linearity heretofore not attainable in servo valves of the prior art are requisites. In order to increase the gain of the servo system it is necessary to reduce the magnitude of the force required to stroke or displace the valve spool or sliding plate. However, in order to obtain this increased gain without making the servo mechanism system unstable, each element of the system must be nearly linear. For the purposes of this application, as relating to hydraulic valves, the linearity of the valve applies to the relationship between flow rate and the force displacing the valve, that is, equal increments of force should produce equal increments of displacement regardless of flow.

A serious limitation to accomplishing this objective is the force developed by the reaction between high velocity jets of fluid and the surfaces of the valve spool or sliding plate. For even low rates of flow these forces are seldom negligible and for large rates they become a most important limitation upon the performance of the valve. The forces required to actuate a valve consists of three principal components—friction, inertia, and flow forces. The hydro-dynamic force caused by the flow of fluid through the valve gap of a servo valve is essentially the same for a plate valve as for a spool valve. It is always in a direction tending to close the valve and may become considerably larger than either friction or inertial forces, and it is often large enough to prevent single stage operation from a low powered actuator such as an electromagnetic torque motor.

Accordingly, it is an object of the present invention to provide an accurately responsive servo valve which is linear throughout its valve stroke.

It is another object of the present invention to provide a servo valve which minimizes the hydro-dynamic forces exerted against the valve.

It is a further object of the present invention to provide an hydraulic servo valve which requires a minimum of actuating force throughout the valve displacement stroke.

It is a still further object of the present invention to provide an hydraulic servo valve for use in a servo mechanism system which results in a smaller valve actuator, a higher gain, and improved linearity of the servo mechanism system.

The present invention provides an improved servo valve which attains linearity and uniform displacement forces throughout its valve stroke by utilizing means for extracting the horizontal momentum of the fluid jet through the valve gap to cause a zero net horizontal force on the sliding member of the valve.

The novel features which are believed to be characteristic of the present invention both as to its organization and method of operation, together with further objects and advantages thereof, will be better understood from the following description considered in connection with the accompanying drawings herein made a part of this specification, in which several embodiments of the invention are illustrated by way of example. It is to be expressly understood, however, that the drawings are for the purpose of illustration and description only, and are not intended as a definition of the limits of the invention.

Fig. 1 is a representative cross sectional view in elevation of an hydraulic servo valve of the type well known to the prior art, and is shown for purposes of discussion and clarity only;

Fig. 2 is an enlarged view of the valve gap formed by the land edge of the valve spool or plate and the edge of the valve body orifice to show the reaction of fluids being ejected through the gap;

Fig. 3 is a graph showing the direction of the fluid jet through the gap in relation to the valve displacement or gap;

Fig. 4 is a representative cross section in elevation similar to that of Fig. 1 of a servo valve constructed in accordance with the present invention;

Fig. 5 is a cross sectional elevation of a presently preferred embodiment of a three-way valve constructed in accordance with the present invention in which those portions of the valve, or fittings connected to the valve, which do not form a part of the present invention are shown schematically;

Fig. 6 is a view in perspective of a valve spool constructed in accordance with another embodiment of the present invention; and Fig. 7 is a representative cross section in elevation similar to Fig. 1 of another embodiment of a servo valve constructed in accordance with the present invention.

Referring to the drawings, and particularly to Fig. 1, a servo valve of the type well known to the prior art is shown. A valve body 10 defines a fluid inlet port 11 and a fluid outlet port 12 which are perpendicular to a contact surface 13 of the valve body 10. A sliding member 14 is positioned in slideable contact with the contact surface 13 of the valve body 10. The sliding member 14 defines in cross section a rectangular cavity 15 which when moved to the right in Fig. 1 is sufficient in lentgh to uncover both the fluid inlet port 11 and the fluid outlet port 12, thus providing a continuous path for the fluid through the valve.

When the sliding member 14 is extended to the right in Fig. 1 to completely uncover both the fluid inlet port 11 and the fluid outlet port 12, the fluid admitted to the valve is delivered through the fluid inlet port 11 to the cavity 15 with no horizontal force component. Similarly, it is discharged through the fluid outlet port 11 with no horizontal force component. In this case the only net change in momentum is the reversal of the direction of flow in the fluid outlet port 12 as compared with the direction of flow in the fluid inlet port 11 and therefore there is no horizontal force reaction on the sliding member 14 although there is a vertical reaction tending to separate the two halves of the valve. In a practical design this vertical reaction is compensated by a symmetrical construction. For example, although the flow cavity 15, as shown in Fig. 1, is essentially two-dimensional, in a spool valve the cavity 15 is circumferential, providing an annular groove around the sliding piston.

With the sliding member 14 in the position shown in Fig. 1 where the fluid outlet port 12 is partially covered by the sliding member, the fluid admitted to the valve through the fluid inlet port 11 will have no horizontal force reaction, but as it passes through the narrow valve gap defined by the land edge 16 of the sliding member 14 and the inner edge 17 of the fluid outlet port into the fluid outlet port 12, a high velocity jet is formed. The jet is directed generally up and toward the right with a large horizontal component of momentum. Since the jet has a horizontal force component toward the right it must also have an equal and opposite horizontal force component which reacts back through the fluid flow cavity 15 against the vertical wall 18 of the cavity.

Referring now to Figs. 2 and 3, the manner in which the direction of the jet varies as it leaves the valve gap in relation to the width of the gap opening is shown. Fig. 2 is a greatly enlarged two-dimensional view of the gap and is shown just as the valve is starting to open to admit fluid to the fluid outlet port 12 of Fig. 1. The radius of the edges is comparable with the gap width. As the valve just begins to open the jet is narrow with little momentum and has a direction which is substantially horizontal. As the valve gap widens the angle $\theta$ which the jet makes with a horizontal line increases from nearly zero to a progressively larger value. At a point where the gap becomes equal to $2(\sqrt{2}-1)r$, where $r$ is the radius of curvature of the edge, by symmetry, $\theta$ will have a value of 45°. At larger openings where the gap is many times the radius of curvature, $\theta$ will have a value which has been found to be equal to approximately 69° and will remain approximately constant so long as the depth of the cavity 15 remains substantially greater than the gap. Therefore, $\theta$, which defines the direction of the momentum forces of the jet passing through the gap as a function of gap length, will be defined by a curve substantially as shown in Fig. 3. This results in a reaction force upon the sliding member which will be a non-linear function of displacement for a fraction of a thousandth of an inch, changing into a function with constant slope over a considerable region, followed by a curving characteristic with decreasing slope dependent upon the ratio of the gap width to the depth of the cavity. The fluid jet formed as the fluid passes through the valve gap of Fig. 1 results in a reduction of pressure exerted upon the vertical wall 19 of the cavity 15 without affecting the pressure exerted on the opposite vertical wall 18, thus producing a reaction force on the vertical wall 18 of the cavity. It may be seen that the jet is a column of fluid containing momentum and serves as a mechanism for transferring momentum out of the cavity; consequently, the forces resulting from the flow of fluid out of the cavity are unbalanced with respect to the cavity and tend to close the valve.

Referring now to Fig. 4, a representative cross section of a valve constructed in accordance with the present invention is shown. A valve body 20 defines a fluid inlet port 21 and a fluid outlet port 22. The fluid outlet port 22 is connected with a fluid outlet chamber 23 which has an internal configuration as described hereinafter. A sliding member 24 is in sliding contact with the lower surface 25 of the valve body 20 and defines a fluid flow cavity 26 which is sufficient in length to uncover the fluid inlet port 21 and provide the maximum desired valve gap between the gap edge 30 and the land edge 31 when moved to the right in Fig. 4.

Affixed to the sliding member 24 and extending within the fluid outlet chamber 23 is a jet directing member 27 composed of one or more reaction surfaces 28. For maximum efficiency the vanes are positioned in such a manner that the entrance angle of the directing paths varies from an angle of nearly 0° (zero degrees) near the base of the jet directing member 27 to a value of approximately 69° for the entrance paths nearest the upper end of the jet directing member. Although the entrance angles are not critical since the jet directing member is affixed to the sliding member, it is preferable to so construct the jet directing member and vanes that the change in direction of the jet takes place smoothly. For that reason, the face 32 of the jet directing member upon which the jet impinges is vertical near the surface of the sliding member and inclined toward the gap at an angle of approximately 45° as shown at 32 for a sufficient distance to overhang slightly the land edge of the sliding member to insure smooth capture and transition of the jet at any angle $\theta$ at which it passes through the valve gap.

In order to allow the land edge 31 to pass under the valve gap edge, the jet directing member may be set back from the land edge by an amount which will be discussed hereinafter in conjunction with the description of a three-way valve. The exit angle of the jet directing paths is normal to the surface of the sliding member. Thus, the horizontal forces of the jet are transmitted to the jet directing member 27.

In two dimensional configuration the fluid outlet chamber is substantially rectangular in form but having a surface 33 mateable with the face 32 of the jet directing member 27. The height of the cavity 23 is sufficiently greater than the height of the jet directing member 27 to produce a fluid outlet path above the jet directing member within the fluid outlet chamber. The width of the fluid outlet chamber 23 is greater than the width of the jet directing member 27 by an amount substantially equal to but greater than the valve stroke, or the amount by which the jet directing member must travel horizontally within the fluid outlet chamber.

Thus, the fluid passing through the valve gap is a jet impinging upon the vanes 28 of the jet directing member 27. Within the paths formed by the vanes the direction of the fluid jet is changed to the vertical direction, thus absorbing the horizontal momentum forces of the jet and transmitting them through the jet directing member to the sliding member 24. Since the horizontal momentum forces acting through the jet directing member 27 upon the sliding member 24 are in a direction opposed to the resulting horizontal forces exerted upon the side 29 of the cavity 26, the net horizontal reaction on the sliding member is zero. Therefore, the sliding member is balanced and the horizontal forces tending to close the valve gap is avoided. Since the horizontal reaction forces on the sliding member are compensated, the force required to actuate the sliding member is uniform throughout the valve travel, and the valve is said to be linear.

Referring to Fig. 5 a three-way spool valve constructed in accordance with a presently preferred embodiment of the present invention is shown. A valve body 50 has a cylindrical opening 51 therethrough in which a sliding spool 52 is free to move horizontally. The spool 52 has a cylindrical land surface 53 substantially equal in outside diameter to the inside diameter of the cylindrical opening 51 through the valve body 50. Groove surfaces 54 having an outside diameter substantially less than the land diameter of the spool define the fluid flow cavities 55, 56. The fluid flow cavities 55, 56 are thus annular cavities defined by the groove diameter of the spool 52, the inside diameter of the cylindrical opening through the valve body 50, and the vertical walls formed by the land surface diameter and groove surface diameter of the spool.

The valve body 50 defines a fluid inlet path 57 which connects a fluid inlet port 58 of the valve body 50 with the annular cavities 55, 56 of the spool 52. The valve body 50 defines a first 61 and second 62 annular fluid outlet chamber longitudinally disposed within the valve body extending from, and normal to, the surface of the cylindrical opening 51. The annular chambers 61, 62 are similar in cross-sectional configuration to the fluid outlet chamber discussed hereinbefore in connection with Fig. 4, but are of opposite hand such that the edge 63 of the first annular chamber 61 forms one side of a first valve gap while the edge 64 of the second annular chamber 62 forms one side of a second valve gap. The longitudinal distance between the edge 63 of the first annular chamber 61 and the edge 64 of the second annular chamber 62 is substantially equal to the longitudinal distance between a first land edge 65 defined by the juncture of the land surface 53 of the spool 52 and the vertical wall 66 of the first annular cavity 55, and the second land edge 67 defined by the juncture of the land surface 53 of the spool and the vertical wall 68 of the second annular cavity 56. Thus, when the valve is in a fully closed position the land edges 65, 67 of the spool substantially coincide with the edges 63, 64 of the annular chambers 61, 62.

Affixed to the spool 52 are a first jet directing member 71 and a second jet directing member 72. The first and second jet directing members are of opposite hand and extend circumferentially about, and normal to, the spool 52 within the annular chambers 61, 62. One or more vanes 73 similar to those described in connection with Fig. 4 are affixed to the first and second jet directing members to define a plurality of annular curved paths. The vanes are so positioned that the entrance angle of the directing paths varies from an angle of nearly 0° near the base of the jet directing members 71, 72 to a value of approximately 69° with respect to the contact surface for the entrance paths nearest the upper end of the jet directing members. Like the jet directing member of Fig. 4, in order to change the direction of the fluid jet smoothly within the paths defined by the vanes 73, the outer face 74, 75 of the jet directing members upon which the jet impinges is vertical near the surface of the spool and inclined toward the valve gap at an angle of approximately 45° for a sufficient distance to overhang slightly the land edges 65, 67 of the spool to insure smooth capture and transition of the jet to the vertical from any angle $\theta$ at which the jet passes through the valve gap. The exit angle of the jet directing paths defined by the vanes 73 is normal to the spool 52, thus the width of the jet directing members is substantially equal and is determined by the valve gap desired for a given valve application.

The longitudinal distance between the outer face 74 of the first jet directing member 71 and the outer face 75 of the second jet directing member 72 is less than the distance longitudinally between the outer vertical wall 76 of the first annular chamber 61 and the outer vertical wall 77 of the second annular chamber by an amount substantially equal to the amount of valve stroke or the maximum valve gap required. The width of the first and second annular chambers 61, 62 is substantially equal to the width of the jet directing member within the chamber plus the length of valve stroke desired, while the outer diameter of the annular chamber is sufficiently greater than the outside diameter of the jet directing member to afford a fluid path for the fluid ejected from the jet directing members.

The outer walls of the annular chambers 61, 62 are mateable with the outer faces 74, 75 of the jet directing members 71, 72, having the vertical walls 76, 77 connected to the gap edges 63, 64 by walls having a slope of approximately 45°.

In order to allow the land edges 65, 67 to pass beyond the valve gap edges, the jet directing members 71, 72 are set back from the land edges by an amount substantially equal to the valve gap desired as an entrance to the first and second annular chambers 61, 62.

The valve body 50 defines a first outlet port 78 which is connected to the first annular chamber 61 and provides a first fluid outlet from the valve body. The valve body 50 also defines a second outlet port 79 connected to the second annular chamber 62 and provides a second fluid outlet from the valve body.

Thus, in operation, an actuating means such as the torque motor 80 shown diagrammatically is connected to the valve spool 52 of the three-way valve illustrated in Fig. 5. If in response to an actuating signal the torque motor 80 moves the spool to the right in Fig. 5 a valve gap is opened as shown in Fig. 5 to the first fluid outlet chamber 61 with the valve gap being formed by the land edge 65 of the spool and the edge 63 of the valve body. Fluid will flow from the valve inlet port 58 through the fluid inlet path 57 through the annular cavity 55 of the valve spool 52, through the valve gap, and into the jet directing member 71. The direction of the jet is then changed as it progresses through the paths defined by the vanes 73 and flows outward from the jet directing member 71 into the first fluid chamber 61 and thence outward through the fluid outlet port 78. In passing between the vanes 73 of the jet directing member 71 the horizontal flow force of the jet is absorbed and transmitted to the valve spool 52. The horizontal component of the jet forces absorbed by the fluid directing member is equal to the resultant force from the jet which is directed upon the vertical surface 81 of the valve spool, and the net horizontal forces on the valve spool are substantially equal to zero throughout the length of travel of the valve spool to the right.

Similarly, if in response to a signal the torque motor 80 moves the spool to the left the valve gap formed by the land edge 65 and the gap edge 63 is closed and the valve gap formed by the land edge 67 of the spool and the edge 64 of the valve body forms a valve gap opening into the second fluid outlet chamber 62 of the valve body. Thus, the fluid will flow from the valve inlet port 58 through the fluid inlet path 57, through the annular cavity 56 of the valve spool, and through the valve gap into the second jet directing member 72. From the second jet directing member the fluid flows into the second annular chamber and through the fluid outlet port 79. The horizontal momentum forces of the jet are absorbed by the vanes 73 of the second jet directing member 72 and once again the net horizontal forces of the valve spool are substantially zero.

Thus, the actuating force required to move the spool to the right or left in Fig. 5 is substantially equal throughout the length of travel and the valve is linear throughout its operation. It has been found that the reaction forces are reduced by means of the present invention by an amount equal to at least 90% and that the valve constructed in accordance with the present invention exhibits no apparent non-linearities.

It will be apparent to one skilled in the art that the servo valve of the present invention which utilizes means for extracting the horizontal momentum of the fluid jet through the valve gap to cause balanced horizontal forces on the sliding member of a valve is applicable to many valve configurations and is not limited to spool valves having annular valve openings. For example, referring to Fig. 6, a spool 100 of the type well known to the art adapted to be used in a spool valve having diametrically opposed fluid outlet chambers which are connected by a fluid path within the valve body, rather than the annular outlet chamber discussed in connection with Fig. 5, is shown. In order to provide a balanced servo valve in accordance with the present invention, the jet directing members 101 are affixed to the spool by drilling holes diametrically through the spool and pressing the previously assembled jet directing members into place. The valve configuration to which the spool of Fig. 6 is adapted would provide a lower discharge rate relative to the linear displacement of the spool than the valve of Fig. 5 in which annular valve gaps and annular fluid outlet chambers are utilized.

Referring to Fig. 7, another embodiment of the present invention is shown in which a fluid reversing cavity 90 which is similar in function to the reversing cavty 26 of Fig. 4 is stationary and connects the fluid inlet path 91 and fluid oulet path 92. Valving action is obtained by a sliding sleeve 93 which slides between the fluid reversing cavity 90 and a valve body 95 which defines the fluid inlet and outlet ports. It may be seen from the foregoing discussion that inasmuch as the fluid directing cavity of the valve is stationary with respect to the inlet and outlet paths of the valves that the horizontal forces which ordinarily tend to close the valve will have no effect upon this embodiment. The horizontal forces which react upon the vertical surface 96 of the valve cavity will have no effect since this surface is stationary and the effect of the horizontal fluid forces upon the sliding member will be negligible since the member is of relatively insignificant cross section in the direction of the horizontal forces.

Thus, what has been described is a servo valve which has a uniform actuating force throughout its valve stroke and which is linear throughout the valve operation since the horizontal fluid forces produced by the fluid flow action within the valve have been compensated, giving a net horizontal reaction on the sliding member of the valve which is substantially equal to zero.

What is claimed is:

1. In a fluid servo valve having an annular outlet passage and an annular variable fluid valve gap defined by an edge of a stationary valve body and an edge of a valve spool slideable within said valve body whereby the flow of fluid to said outlet passage is varied; a jet directing member within said outlet passage, said jet directing member being circumferentially affixed substantially normal to said valve spool proximate said valve gap, a series of axially spaced annular vanes affixed to said jet directing member in positions overlapping said fluid gap to be successively moved into said fluid gap as said fluid gap is increased, said vanes being of curved cross section and defining a plurality of curved fluid paths having entrances proximate said valve gap for deflecting fluid passing through said valve gap to a direction substantially normal to said sliding member.

2. A fluid servo valve comprising: a valve body, said valve body having a cylindrical opening therethrough, a valve spool having an outside surface in sliding contact with the inside surface of said cylindrical opening, said valve body defining a fluid inlet path substantially normal to and extending through said contact surface of said valve body, said valve body defining a fluid outlet chamber extending from and substantially normal to said contact surface of said valve body, said valve body defining a fluid outlet port through said valve body connected to said fluid outlet chamber; said valve spool having a surface of decreased diameter, said surface of decreased diameter being longitudinally positioned to form a fluid flow path connecting said fluid inlet path and said fluid outlet chamber, an edge of said outlet chamber and an edge of said spool proximate said surface of decreased diameter defining a variable fluid flow valve gap to said outlet chamber; a jet directing member affixed to said spool within said fluid outlet chamber proximate said valve gap, and a plurality of vanes affixed to said jet directing member defining a plurality of fluid paths, said fluid paths having entrance angles varying from approximately zero degrees to sixty-nine degrees with respect to the longitudinal axis of said spool for deflecting fluid admitted to said outlet chamber to a direction substantially normal to the longitudinal axis of said spool.

3. A fluid control valve comprising, a valve body having a spool cavity and axially displaced inlet and outlet ports communicating at an angle with said spool cavity, ing a spool cavity and axially displaced inlet and outlet a spool having a pair of axially displaced lands defining a recess therebetween, said spool being slidably fitted in said cavity with said recess communicating with said inlet port and one of said lands having an edge cooperating with an edge of said outlet port to form a variable fluid gap for controlling fluid flow from said recess into said outlet port, and a plurality of axially spaced fluid directing vanes mounted on said spool adjacent said one land and projecting into said outlet port in positions to be successively moved into said fluid gap upon movement of said spool to increase said gap.

4. A fluid control valve comprising, a valve body having a spool cavity and axially displaced inlet and outlet ports communicating at an angle with said spool cavity, a spool having a pair of axially displaced lands defining a recess therebetween, said spool being slidably fitted in said cavity with said recess communicating with said inlet port and one of said lands having an edge cooperating with an edge of said outlet port to form a variable fluid gap for controlling fluid flow from said recess into said outlet port, a plurality of axially spaced fluid directing vanes mounted on said spool adjacent said one land at differing angles of inclination with respect to the longitudinal axis of said spool and projecting into said outlet port in positions to be successively moved into said fluid gap upon movement of said spool to increase said fluid gap, said angles of inclination successively increasing in substantial correspondence with the increasing angle of fluid flow through said gap relative to the longitudinal axis of said spool, as said fluid gap increases.

5. A fluid control valve comprising, a valve body having a spool cavity and axially displaced inlet and outlet ports communicating at an angle with said spool cavity, a spool having a pair of axially displaced lands defining a recess therebetween, said spool being slidably fitted in said cavity with said recess communicating with said inlet port and one of said lands having an edge cooperating with an edge of said outlet port to form a variable fluid gap for controlling fluid flow from said recess into said outlet port, a plurality of axially spaced fluid directing vanes mounted on said one land at differing angles of inclination with respect to the longitudinal axis of said spool and projecting into said outlet port in positions to be successively moved into said fluid gap upon movement of said spool to increase said fluid gap, said angles of inclination successively increasing in substantial correspondence with the increasing angle of fluid flow through said gap relative to the longitudinal axis of said spool as said fluid gap increases, each of said vanes being curved and presenting a concave face to fluid flow through said fluid gap, the concavity of said vanes successively decreasing in accordance with the order of presentation of said vanes at said fluid gap.

References Cited in the file of this patent

UNITED STATES PATENTS

| 112,058 | Lynde | Feb. 21, 1871 |
| 2,134,803 | Rose | Nov. 1, 1938 |
| 2,391,531 | Warren | Dec. 25, 1945 |
| 2,747,612 | Lee | May 29, 1956 |

FOREIGN PATENTS

| 614,987 | France | Oct. 1, 1926 |

UNITED STATES PATENT OFFICE
CERTIFICATE OF CORRECTION

Patent No. 2,843,351                              July 15, 1958

Raymond Howard Griest

It is hereby certified that error appears in the printed specification of the above numbered patent requiring correction and that the said Letters Patent should read as corrected below.

Column 8, line 1, strike out "ports communicating at an angle with said spool cavity," and insert the same after "outlet" in line 2, same column.

Signed and sealed this 14th day of October 1958.

(SEAL)
Attest:

KARL H. AXLINE
Attesting Officer

ROBERT C. WATSON
Commissioner of Patents